United States Patent Office
2,978,399
Patented Apr. 4, 1961

2,978,399

HOMOGENEOUS NUCLEAR REACTOR FUEL COMPOSITION

Louis Silverman, Los Angeles, Robert A. Sallach, Canoga Park, and Rachel L. Seitz, Van Nuys, Calif., assignors to North American Aviation, Inc.

No Drawing. Filed Apr. 29, 1957, Ser. No. 655,493

15 Claims. (Cl. 204—193.2)

This invention relates to a homogeneous nuclear reactor fuel composition. More particularly, this invention relates to a uranyl sulfate-containing aqueous fuel composition.

For information concerning the well-known aqueous solution-type reactors referred to as "Water Boiler" reactors, reference is made to the following reports: AECD–3059; AECD–3287; ORO–33; LA–1337; and "Research Reactors," all available from the Technical Information Service of the U.S. Atomic Energy Commission; The Proceedings of the Conference on the Peaceful Uses of Atomic Energy, vol. 2, page 372 (1955); and to Atomics International's report designated as AI–1629, May 1956. Reference is also made to the copending applications of the common assignee Serial No. 572,841, now Patent No. 2,879,146, "Gas Recombiner"; Serial No. 605,081, now abandoned, "Vapor Pressure Water Boiler Reactor"; and Serial No. 607,929, now Patent No. 2,937,127, issued May 17, 1960, "Low Cost Nuclear Research Reactor."

When a solution-type reactor is in operation hydrogen peroxide is formed as a consequence of radiolytic decomposition of water. The hydrogen peroxide reacts with the uranyl sulfate fuel to produce uranyl peroxide and when the solubility product of the latter compound is surpassed it precipitates from solution. Consequently, there is a reduction in the concentration of uranium left in solution causing the fission action to slow down if not altogether cease. Another effect of the peroxide precipitation is that uranyl peroxide may settle in spots as an insoluble precipitate and form fast-acting fission sites which induce and accelerate corrosion.

The rate of hydrogen peroxide production is directly related to the energy output of the reactor. This, therefore, puts a maximum limit on the concentration of uranium in solution and on the power output of solution-type homogeneous reactors for, as the power output of a reactor is increased, a rate of hydrogen peroxide production is reached which is sufficient to provide a high enough concentration of peroxide to precipitate uranium from solution as uranyl peroxide. In order to obtain maximum power output for a particular concentration of uranium in a homogeneous solution, therefore, it has been necessary to keep the concentration of total uranium at a minimum, while keeping the U-235 content of the uranium at a maximum. Consequently, to obtain high power densities in solution-type reactors, fuels which are highly enriched with uranium-235 have been required. Furthermore, the limit on the maximum uranium content limits the maximum power which is obtainable from such solutions. This situation is especially unsatisfactory in geographical areas where highly enriched uranium fuels are not available.

One attempted solution with a view to raising the tolerable maximum concentration of uranium has been the addition of a peroxide decomposition catalyst to the aqueous uranyl sulfate system. In a report by M. D. Silverman et al. in Industrial and Engineering Chemistry, 48, 1238–41 (1956), it is shown that there is an upper limit on the useful concentration of a catalyst for the purpose of aiding the decomposition of peroxides. The report shows, for example, that the effectiveness of iron in solution in preventing uranyl peroxide precipitation begins to level off at a concentration of about four parts per million (p.p.m.) of the iron. The parts per million are defined as grams per million milliliters or per million cubic centimeters of solution. The maximum catalytic effectiveness for iron is reported to be reached at about 11 p.p.m. Ruthenium, in the form of ruthenium sulfate, another good catalyst, reaches maximum efficiency at a concentration of about 29 p.p.m. The $Cr^{+3}$ ion has only about 6% of the efficiency of $Fe^{+2}$ ion and reaches maximum efficiency at about 24 p.p.m. As a necessary conclusion of the investigation, it is estimated in the report that the allowable power density obtainable from a uranyl sulfate water solution is about 0.5 kw. per liter. A problem has, therefore, existed of developing a fuel system which does not have these limitations.

It is, therefore, an object of the present invention to provide a fuel system or composition capable of operating at relatively high power levels.

Another object of this invention is to provide a homogeneous fuel composition for a nuclear reactor which does not result in precipitation of uranyl peroxide. Still another object is to provide a homogeneous fuel composition which permits the operation of reactors at satisfactory power levels utilizing uranium fuel containing a relatively low percentage of uranium-235. Other objects of this invention will become apparent from the discussion which follows.

The above and other objects of this invention are accomplished by providing a nuclear reactor fuel composition comprising an aqueous solution containing from about 75 to about 750 grams of uranium per liter in the form of uranyl sulfate; from about 17 mg. to about 600 mg. per liter, i.e.; from about 17 to about 600 p.p.m., of at least one metal ion, which is capable of existing in the solution in more than one valence state, in the form of a metal sulfate; from about 13 g. to about 150 g. of sulfuric acid per liter; and the balance consisting essentially of water; and wherein the relative amounts of uranium, metal ion and sulfuric acid are such that there are from about 0.17 to about 2 mg. of said metal ion per gram of uranium and from about 0.13 g. to about 0.5 g. of sulfuric acid per gram of uranium. The amount of sulfuric acid in the fuel composition is seen to be such that the pH of the solution is always less than 1.

Non-limiting examples of the metal sulfates are the sulfates of group IB metals of the periodic table as published in the "Handbook of Chemistry and Physics," by the Chemical Rubber Publishing Company, Cleveland, Ohio, such as copper sulfate; sulfates of group VB metals such as vanadium sulfate; the sulfates of the group VIII transition metals such as iron sulfate, ruthenium sulfate, palladium sulfate; etc. The above sulfates can be used singly or in combination of two or more. It is found, for example, that iron in the form of a sulfate is particularly effective in aiding the decomposition of peroxides, permitting the operation of a nuclear reactor at higher power densities without precipitation of uranyl peroxide than when other catalysts are employed. Compositions employing sulfates of iron, therefore, constitute a preferred embodiment of this invention. When more than one metal sulfate is employed a combination of iron sulfate and copper sulfate is preferred. Amounts of copper above about 40 p.p.m. do not increase the effectiveness of the catalyst substantially. Therefore, catalyst composition of from about 16 mg. to about 560 mg. of iron per liter together with from about 1 to about 40 mg. of copper per liter constitute a preferred embodiment of this invention.

When the uranium employed is approximately 90% enriched in U-235, it is found that 100 grams per liter of uranium in a substantially geometrically spherical total volume of about 12½ liters, is sufficient to sustain a fission reaction and provide a zero power critical condition. This concentration of uranium, together with 0.13 mol per liter sulfuric acid, plus 17 mg. per liter, i.e. 17 p.p.m., of iron as iron sulfate, results in no precipitation of uranyl peroxide when a reactor is operated as described in the examples given hereinbelow. This fuel solution has substantially 0.17 mg. of iron and 0.13 gram of sulfuric acid per gram of uranium. When the uranium employed has about a 10% content of U-235 and the total uranium content is 750 grams per liter in the form of uranyl sulfate, in a total volume of approximately 30 liters, a quantity of 1.0 mol per liter of sulfuric acid and 128 p.p.m. of iron in the form of iron sulfate is adequate to prevent the precipitation of uranyl peroxide at power levels of substantially 3 kw. per liter at a temperature of approximately 80° C. In the latter fuel there are substantially 0.13 g. of sulfuric acid and 0.17 mg. of iron per gram of uranium.

A preferred embodiment of this invention is an aqueous uranyl sulfate fuel composition containing iron sulfate and sulfuric acid in which the amount of sulfuric acid is equivalent to from about 0.13 g. to about 0.24 g. of acid per gram of uranium, as it is found that at this concentration of sulfuric acid and at various concentrations of iron sulfate, the reactor can be operated at relatively higher power levels without precipitation of uranyl peroxide than when the concentration of sulfuric acid is outside this range.

When the metal catalyst employed in the fuel composition is iron in the form of ferric sulfate and/or ferrous sulfate, the amounts can vary from about 0.17 mg. of iron to about 2.0 mg. of iron per gram of uranium. A preferred amount is from about 0.3 mg. to about 0.8 mg. of iron per gram of uranium. The latter amount provides for a higher rate of peroxide decomposition.

The amount of uranium in the fuel in the form of uranyl sulfate should be sufficient to sustain nuclear fission reaction. A concentration of 75 grams per liter of uranium which is approximately 90% enriched with uranium-235 is sufficient for sustained nuclear fission when the total volume of the fuel is about fifteen liters. The fuel should be contained in a vessel which provides for a minimum vessel surface-to-volume ratio so that a spherically shaped vessel is usually used. As the percentage of uranium-235 enrichment is decreased, either the concentration of uranium must be increased or the total fuel volume in the reactor core has to be increased in order that sustained fission reaction conditions be obtained. For example, when the uranium is about 10% enriched with uranium-235 and the concentration is about 750 grams of uranium per liter in the form of uranyl sulfate, a reactor core volume of about 20 liters will suffice to provide for a sustained nuclear fission reaction. On the other hand, when the concentration of 10% U-235 enriched uranium is about 350 grams per liter, a volume of about 40 liters will provide sustained nuclear fission reaction conditions. On the other hand, when the fuel contains more than about 750 grams of uranium per liter in the form of uranyl sulfate, it may be necessary to maintain the fuel at elevated temperature in order to keep all the uranyl sulfate in solution. Therefore, an embodiment of this invention is a fuel containing from about 75 grams to about 750 grams of uranium per liter in the form of uranyl sulfate.

When the U-235 content of the uranium is from about 10% to about 60%, the preferred concentration of uranium is from about 200 to about 350 grams per liter as in that case the total volume of the fuel solution can be kept within practical and convenient limits.

In view of the above, it is seen that a preferred embodiment of this invention is an aqueous nuclear reactor homogeneous fuel composition comprising from about 200 to about 350 grams of uranium per liter in the form of uranyl sulfate; from about 60 mg. to about 280 mg. per liter of at least one metal ion of the type specified above; from about 26 gms. to about 84 gms. per liter of sulfuric acid; and the balance being essentially water; and wherein the relative amounts of uranium, metal ion and sulfuric acid are such that there are from about 0.3 mg. to about 0.8 mg. of metal ion per gram of uranium, and from 0.13 gram to about 0.24 gram of sulfuric acid per gram of uranium.

The homogeneous reactor fuel composition can be made by adding the various components to the fuel container in any convenient order, for example, the required amount of water may be added to the container first, followed by the addiiton of the sulfuric acid, the iron sulfate, and the uranyl sulfate in that order. Alternatively, the uranyl sulfate may be added to the water first and then followed by the sulfuric acid and the iron sulfate. In still another manner of addition, part of the sulfuric acid may be added to the water before the addition of the uranyl sulfate, and the balance of the sulfuric acid added thereafter. The uranyl sulfate may be added in the solid form or in the form of a concentrated aqueous solution. Still other methods of making up the fuel composition will be evident to those skilled in the art.

The following examples more clearly illustrate the fuels of this invention:

*Example I*

The reactor characteristics shown below are those of the 50 kw. water boiler nuclear reactor described and shown in the drawing of copending application Serial Number 572,841 of the common assignee.

To a spherical stainless steel reactor core tank in this reactor there is added sulfuric acid, iron sulfate and concentrated uranyl sulfate solution, so as to make up an aqueous solution containing 112 grams per liter of uranium, 19 p.p.m. of iron in the form of ferric sulfate, 19 p.p.m. of copper in the form of copper sulfate and 0.26 mol per liter of sulfuric acid, the balance being essentially water. The uranium contains approximately 90% uranium-235. The characteristics of the reactor are as follows:

| | |
|---|---|
| Design power | 50 kw. |
| Zero power critical mass | 1200 gm. $U^{235}$. |
| Maximum thermal neutron flux | $1.7 \times 10^{12}$ n/cm.$^2$-sec. |
| Mass coefficient of reactivity | 0.024%/gm. |
| Temperature coefficient of reactivity | 0.25%/° C. |
| Power Coefficient of reactivity | 0.006%/kw. |
| Fuel solution temperature at 50 kw. | 80° C. |
| Excess reactivity at 20° C., zero power | 3%. |
| Reactivity held in control and safety rods | 7.2% (1.8% each rod). |
| H:$U^{235}$ atomic ratio | 300. |
| $U^{235}$ concentration | 105 gm./liter. |
| Power density, maximum | 5.5 watt/cm.$^3$ |
| Power density, average | 3.85 watt/cm.$^3$ |

The concentration of metal ion and sulfuric acid is such that there are 0.17 mg. of Fe, 0.17 mg. of copper, and 0.24 g. of sulfuric acid per gram of uranium.

No precipitate is formed in the operation of this reactor.

*Example II*

When a reactor similar to that of Example I is operated on a solution containing 100 grams uranium per liter in which the uranium is approximately 90% U-235, 0.13 mol per liter of sulfuric acid and 17 p.p.m. of iron as ferric sulfate, at a temperature of 80° C., and a power density of 3 kw. per liter, no precipitate is formed. In this fuel there are substantially 0.17 mg. of iron and 0.13 g. of sulfuric acid per gram of uranium.

Similar results are obtained when the concentration of uranium is 75 grams per liter in the process of Example II.

*Example III*

A reactor is operated as in Example I on an aqueous solution containing about 300 grams per liter of uranium, 180 p.p.m. of iron in the form of iron sulfate, and sulfuric acid at a concentration of 0.54 mol per liter. The uranium is 20% enriched in uranium-235 and the total amount of uranium is 9000 grams. In this fuel there are 0.6 mg. of iron and 0.18 g. of sulfuric acid per gram of uranium. When the reactor containing this fuel composition is operated at 80° C., so as to provide a power density of about 15 kw. per liter, no peroxide precipitate is formed.

In like manner, when the procedure of Example III is repeated, with the variation that the sulfuric acid concentration is changed in successive runs to 0.40 mol per liter, 0.45 mol per liter, 0.72 mol per liter, 0.74 mol per liter, 1.08 mols per liter, and 1.5 mols per liter, while the power density is 7 kw. per liter, 11 kw. per liter, 22 kw. per liter, 22.5 kw. per liter, 22 kw. per liter, and 19 kw. per liter, respectively; there is no uranyl peroxide precipitate. In other words, in these particular fuel solutions at the power densities stated, a steady state of peroxide concentration is obtained such that the solubility of the uranyl peroxide is not exceeded. In the above runs, the amount of iron is 0.6 mg. per gram of uranium, while the amount of sulfuric acid is 0.13 g., 0.15 g., 0.24 g., 0.25 g., 0.35 g., and 0.5 g. per gram of uranium respectively.

When the reactor is operated as in Example III, keeping the concentration of iron at 90 p.p.m., while changing the concentrations of the sulfuric acid so as to provide runs having sulfuric acid at concentrations of 0.45 mol per liter, 0.54 mol per liter, 0.72 mol per liter, and 1.08 mols per liter, there is no uranyl peroxide precipitate when the power densities are 5 kw. per liter, 9 kw. per liter, 12 kw. per liter and 11 kw. per liter, respectively. In these runs the amount of iron is 0.3 mg. per gram of uranium, while the amount of sulfuric acid is equivalent to 0.15 g., 0.18 g., 0.24 g., and 0.35 g. per gram of uranium, respectively.

*Example IV*

A reactor is operated as in Example I on a fuel containing 750 grams of uranium per liter in the form of uranyl sulfate, at a temperature of 90° C. The uranium-235 content is 15% and the total amount of uranium is 22,500 grams. The amount of sulfuric acid in this solution is 1.5 mols per liter and the amount of iron in the form of ferric sulfate is 600 p.p.m. The reactor in this case is operated at a power density of substantially 7 kw. per liter. No peroxide precipitate is formed. The concentration of iron in this solution is equivalent to 0.8 mg. per gram of uranium, while the sulfuric acid is present in an amount equivalent to 0.2 g. per gram of uranium.

*Example V*

As in Example I, a reactor is operated on an aqueous uranyl sulfate solution containing 300 grams of uranium per liter, 30 p.p.m. of iron in the form of ferric sulfate and 0.54 mol per liter of sulfuric acid. The uranium is 20% enriched in U-235 and the total amount of uranium in the reactor is 8400 grams. The reactor is operated at a temperature of 80° C. and at a power density of substantially 3 kw. per liter. By withdrawing a sample of the fuel every minute, beginning immediately after start-up, it is found that the rate of formation of hydrogen peroxide is 0.5 gram per liter per minute and the steady state concentration of hydrogen peroxide is 2.5 grams per liter. No uranyl peroxide precipitate is formed. The amount of iron in this fuel is equivalent to 0.1 mg. per gram of uranium and the amount of sulfuric acid is equivalent to 0.18 g. per gram of uranium.

*Example VI*

A reactor is operated on an aqueous uranyl sulfate homogeneous fuel composition containing 300 grams per liter of uranium enriched with 20% uranium-235, ferric sulfate in an amount equivalent to 2.0 mg. of iron per gram of uranium, i.e. 600 p.p.m. of iron, and 0.18 g. of sulfuric acid per gram of uranium. The reactor is operated at a power density of 0.025 kw. per liter at a temperature of substantially 23° C. No precipitate is formed.

Likewise, no precipitate is formed when the procedure of Example VI is repeated using an amount of ferric sulfate equivalent to 1.8 mg. of iron per gram of uranium.

*Example VII*

A reactor is operated as in Example I on a homogeneous aqueous fuel containing 200 g. of uranium per liter in the form of uranyl sulfate, 60 mg. of iron per liter in the form of ferric sulfate, and 26 grams of sulfuric acid per liter. The fuel contains, therefore, 0.3 mg. of iron and 0.13 grams of sulfuric acid per gram of uranium. The uranium is 60% enriched with uranium-235. In an operation at 80° C. and a power density of 3 kw. per liter, no precipitate is formed.

*Example VIII*

A reactor is operated as in Example I at 80° C. and a power density of 8 kw. per liter on an aqueous fuel containing 250 grams of uranium per liter in the form of uranyl sulfate. The uranium has a 25% uranium-235 content. The fuel contains 125 g. of sulfuric acid per liter and 400 p.p.m. of iron in the form of ferric sulfate. The balance of the fuel is essentially water. The fuel therefore contains 0.5 g. of sulfuric acid and 2.0 mg. of iron per gram of uranium. No precipitate is formed.

*Example IX*

When a reactor is operated as in Example VIII on an aqueous fuel containing uranyl sulfate in an amount equivalent to 300 grams of uranium per liter enriched with 30% U-235, 160 p.p.m. of vanadium and 0.54 mol per liter of sulfuric acid. No precipitate is formed. The fuel in this case contains 0.53 mg. of vanadium and 0.18 g. of sulfuric acid per gram of uranium and the reactor is operated at a power density of substantially 1.2 kw. per liter.

Good results are also obtained when palladium is substituted for vanadium in the operation of Example IX and the temperature is 95° C. In like manner when the catalyst consists of 16 mg. of iron and 1 mg. of copper per liter in the form of their sulfates, the build up of uranyl peroxide in a reactor is inhibited. Likewise, 560 mg. of iron and 40 mg. of copper per liter serves a similar purpose.

*Example X*

A reactor is operated as in Example VIII on an aqueous fuel containing 350 g. per liter of uranium, 20% enriched in U-235, in the form of uranyl sulfate, 280 p.p.m. of iron in the form of ferric sulfate, and 84 g. per liter of sulfuric acid, the balance being substantially water. The fuel in this case contains 0.8 mg. of iron and 0.24 g. of sulfuric acid per gram of uranium in solution. The total volume is substantially 20 liters. No precipitate is formed.

In like manner good operation is obtained when the U-235 content of the uranium is 10% and the total volume is essentially 40 liters.

*Example XI*

A reactor of the type described in Example I is operated on an aqueous fuel containing 100 g. of uranium in the form of uranyl sulfate and 11 p.p.m. of iron as the sulfate. The concentration of the iron is 0.11 mg. per gram of uranium. The uranium is about 90% enriched with uranium-235. At a power density of substantially 0.7 kw. per liter, uranyl peroxide precipitate is formed at 80° C.

Example XI illustrates the detrimental results obtained when operating a reactor on a homogeneous fuel of the type known in the art. On the other hand, Example II illustrates that adding an amount of sulfuric acid equivalent to 0.13 gram per gram of uranium and at an iron concentration of 0.17 mg. per gram of uranium, the fuel composition lends itself to reactor operation at a power density of 3 kw. per liter without the formation of a precipitate.

While it may be possible to operate a reactor on a homogeneous fuel of this invention containing less than the expressed lower limit of 0.13 gram of sulfuric acid per gram of uranium, it is found however that approximately 0.13 gram of sulfuric acid per gram of uranium and an overall minimum of substantially 0.13 mol of sulfuric acid per liter is required to provide a fuel composition which will not produce a precipitate at substantial power densities. For similar reasons the lower limit on the amount of metal such as iron in solution is 0.17 mg. per gram of uranium. At the upper limits no particular advantage is obtained in the fuel characteristics in going above about 0.5 g. of sulfuric acid and 2.0 mg. of metal such as iron per gram of uranium in the fuel.

It is seen from the examples that the temperature at which the reactor can be operated on the fuel composition of this invention can vary from about 23° C. to about 95° C. or higher. However, the rate of peroxide decomposition is very low at temperatures below 60° C. and therefore 60° C. represents a lower preferred temperature. In order not to approach the boiling points of the composition too closely the preferred upper temperature is 90° C. Hence, a range of operating temperatures of from about 60° C. to about 90° C. constitutes a preferred embodiment in the operation of the reactors on the fuel composition of this invention. Another embodiment is a temperature range of from about 70° C. to about 90° C. which brackets a more practical range of operating conditions for the purpose of aiding in the decomposition of any peroxide formed. An especially preferred temperature is 80° C. which in effect is a mean between the 70° C. and 90° C. limits of the preferred range. It is to be noted, however, that the temperature at which the reactor is operated does not affect the proportion in which the various components of the fuel composition of this invention can be combined other than as stated hereinabove.

The power density at which the reactor can be operated depends to a large extent on the efficiency of the cooling system. The upper limit on the operating power density formerly existing due to the peroxide formation and resultant precipitation is raised by the use of the fuel composition of this invention as illustrated by the examples.

The examples given above are merely illustrative and not restrictive of the present invention. As stated above the components of the fuel composition are essentially water, uranyl sulfate, sulfuric acid, and a metal sulfate. The aqueous uranyl sulfate fuel compositions of the type described above may be used in a variety of homogeneous fuel reactors of the type described in the references given. Variations of the composition may be made within the scope of the invention by those familiar with nuclear fuel technology and the operation of nuclear reactors. Therefore, the present invention should be limited only as is indicated by the appended claims.

We claim:

1. An aqueous nuclear reactor fuel composition having a pH less than one, comprising from about 75 to about 750 grams of uranium per liter in the form of uranyl sulfate; from about 17 mg. to about 600 mg. per liter of the ions of at least one metal selected from the class consisting of group IB, group VB, and group VIII metals of the periodic table of elements, which metal ions are capable of existing in more than one valence state, in the form of a metal sulfate; from about 13 g. to about 150 g. of sulfuric acid per liter; and the balance consisting essentially of water; and wherein the relative amounts of uranium, metal ion and sulfuric acid are such that there are from about 0.17 to about 2 mg. of said metal ion per gram of uranium and from about 0.13 g. to about 0.5 g. of sulfuric acid per gram of uranium.

2. An aqueous nuclear reactor fuel composition having a pH less than one, comprising from about 75 to about 750 grams of uranium per liter in the form of uranyl sulfate; from about 17 mg. to about 600 mg. per liter of the ions of metals capable of existing in more than one valence state wherein said ions are ions of iron in the form of sulfate of iron; from about 13 grams to about 150 grams of sulfuric acid per liter; and the balance consisting essentially of water; and wherein the relative amounts of uranium, ions of iron and sulfuric acid are such that there are from about 0.17 to about 2 mg. of said iron ions per gram of uranium and from about 0.13 gram to about 0.5 gram of sulfuric acid per gram of uranium.

3. The composition of claim 2 wherein the metal sulfate is ferric sulfate.

4. An aqueous nuclear reactor fuel composition having a pH less than one, comprising from about 75 to about 750 grams of uranium per liter in the form of uranyl sulfate; from about 17 mg. to about 600 mg. per liter of the ions of metals capable of existing in more than one valence state wherein said ions consist essentially of from about 16 to about 560 mg. of iron per liter and from about 1 to about 4.0 mg. of copper per liter, said metals being in the form of sulfates; from about 13 grams to about 150 grams of sulfuric acid per liter; and the balance consisting essentially of water; and wherein the relative amounts of uranium, metal ions and sulfuric acid are such that there are from about 0.17 to about 2 mg. of said metal ions per gram of uranium and from about 0.13 gram to about 0.5 gram of sulfuric acid per gram of uranium.

5. An aqueous nuclear reactor fuel composition having a pH less than one, comprising from about 200 to about 350 grams of uranium per liter in the form of uranyl sulfate; from about 60 mg. to about 280 mg. per liter of the ions of at least one metal selected from the class consisting of group IB, group VB, and group VIII metals of the periodic table of elements, which metal ions are capable of existing in more than one valence state, in the form of a metal sulfate; from about 26 gms. to about 84 gms. per liter of sulfuric acid; and the balance being essentially water; and wherein the relative amounts of uranium, metal ion and sulfuric acid are such that there are from about 0.3 mg. to about 0.8 mg. of metal ion per gram of uranium, and from 0.13 grams to about 0.24 grams of sulfuric acid per gram of uranium.

6. A nuclear reactor fuel composition having a pH less than one, comprising an aqueous solution containing substantially 300 grams per liter of uranium in the form of uranyl sulfate; substantially 0.18 g. of sulfuric acid per gram of uranium and ferric sulfate in an amount equivalent to 0.6 mg. of iron per gram of uranium, the balance being essentially water.

7. The composition of claim 4, wherein the uranium has a 20% content of U-235.

8. An aqueous nuclear reactor fuel composition having a pH less thain one, comprising from about 75 to about 750 grams of uranium per liter in the form of uranyl sulfate; wherein said uranium has a U-235 content of from about 10 percent to about 90 percent; from about 17 mg. to about 600 mg. per liter of the ions of at least one metal selected from the class consisting of group IB, group VB and group VIII metals of the periodic table of elements, which metal ions are capable of existing in more than one valance state, in the form of a metal sulfate; from about 13 g. to about 150 g. of sulfuric acid per liter; and the balance consisting essentially of water; and wherein the relative amounts of uranium, metal ion and sulfuric acid are such that there are from about 0.17 to about 2 mg. of said metal ion per gram of uranium and from about 0.13 g. to about 0.5 g. of sulfuric acid per gram of uranium.

9. An aqueous nuclear reactor fuel composition having a pH less than one, comprising substantially 112 grams of uranium per liter in the form of uranyl sulfate; substantially 19 milligrams of iron and 19 milligrams of copper per liter, said iron and said copper being present in the form of their sulfates; substantially 26 grams of sulfuric acid per liter; and the balance consisting essentially of water; wherein the relative amounts of uranium, iron, copper and sulfuric acid are such that there are substantially 0.17 milligram of iron and 0.17 milligram of copper, and 0.24 gram of sulfuric acid respectively per gram of uranium.

10. An aqueous nuclear reactor fuel composition having a pH less than one, comprising substantially 112 grams of uranium per liter in the form of uranyl sulfate wherein said uranium has a U-235 content of about 90 percent; substantially 19 milligrams of iron and 19 milligrams of copper per liter, said iron and said copper being present in the form of their sulfates; substantially 26 grams of sulfuric acid per liter; and the balance consisting essentially of water; wherein the relative amounts of uranium, iron, copper and sulfuric acid are such that there are substantially 0.17 milligram of iron and 0.17 milligram of copper per gram of uranium and substantially 0.24 gram of sulfuric acid per gram of uranium.

11. An aqueous nuclear reactor fuel composition having a pH less than one comprising from about 200 to about 350 grams of uranium per liter in the form of uranyl sulfate wherein said uranium has a U-235 content of from about 10 percent to about 90 percent; from about 60 mg. to about 280 mg. per liter of the ions of at least one metal selected from the class consisting of group IB, group VB and group VIII metals of the periodic table of elements, which metal ions are capable of existing in more than one valence state, in the form of a metal sulfate; from about 26 gms. to about 84 gms. per liter of sulfuric acid; and the balance being essentially water; and wherein the relative amounts of uranium, metal ion and sulfuric acid are such that there are from about 0.3 mg. to about 0.8 mg. of metal ion per gram of uranium, and from 0.13 gram to about 0.24 gram of sulfuric acid per gram of uranium.

12. An aqueous nuclear reactor fuel composition having a pH less than one, comprising from about 200 to about 350 grams of uranium per liter in the form of uranyl sulfate; from about 60 mg. to about 280 mg. per liter of iron in the form of iron sulfate; from about 26 grams to about 84 grams per liter of sulfuric acid; the balance being essentially water; and wherein the relative amounts of uranium, iron and sulfuric acid are such that there are from about 0.3 mg. to about 0.8 mg. of iron per gram of uranium, and from 0.13 gram to about 0.24 gram of sulfuric acid per gram of uranium.

13. An aqueous nuclear reactor fuel composition having a pH less than one, comprising from about 200 to about 350 grams of uranium per liter in the form of uranyl sulfate, wherein said uranium has a U-235 content of from about 10 percent to about 60 percent; from about 60 mg. to about 280 mg. per liter of iron in the form of iron sulfate; from about 26 grams to about 84 grams per liter of sulfuric acid; the balance being essentially water; and wherein the relative amounts of uranium, iron and sulfuric acid are such that there are from about 0.3 milligram to about 0.8 milligram of iron per gram of uranium, and from 0.13 gram to about 0.24 gram of sulfuric acid per gram of uranium.

14. An aqueous nuclear reactor fuel composition having a pH less than one, comprising substantially 350 grams of uranium per liter in the form of uranyl sulfate; substantially 280 milligrams per liter of ions of iron in the form of iron sulfate; substantially 84 grams per liter of sulfuric acid; and the balance being essentially water; and wherein the relative amounts of uranium, ions of iron and sulfuric acid are such that there are substantially 0.8 milligram of ions of iron per gram of uranium and substantially 0.24 gram of sulfuric acid per gram of uranium.

15. An aqueous nuclear reactor fuel composition having a pH less than one, comprising substantially 350 grams of uranium per liter in the form of uranyl sulfate, wherein said uranium has a U-235 content of substantially 20 percent; substantially 280 milligrams per liter of ions of iron in the form of iron sulfate; substantially 84 grams per liter of sulfuric acid; and the balance being essentially water; and wherein the relative amounts of uranium, ions of iron and sulfuric acid are such that there are substantially 0.8 milligram of ions of iron per gram of uranium and substantially 0.24 gram of sulfuric acid per gram of uranium.

References Cited in the file of this patent

Industrial and Engineering Chemistry, 48, 1238–41 (August 1956). (Copy in Library 204/193.2–35.)